United States Patent
Bradley

(10) Patent No.: US 11,113,305 B1
(45) Date of Patent: *Sep. 7, 2021

(54) MODELING OF A NON-RELATIONAL DATABASE AS A NORMALIZED RELATIONAL DATABASE

(71) Applicant: Progress Software Corporation, Bedford, MA (US)

(72) Inventor: Robert Scott Bradley, Bahama, NC (US)

(73) Assignee: Progress Software Corporation, Bedford, MA (US)

( * ) Notice: Subject to any disclaimer, the term of this patent is extended or adjusted under 35 U.S.C. 154(b) by 286 days.

This patent is subject to a terminal disclaimer.

(21) Appl. No.: 16/036,219

(22) Filed: Jul. 16, 2018

Related U.S. Application Data

(63) Continuation of application No. 15/271,008, filed on Sep. 20, 2016, now Pat. No. 10,031,957, which is a continuation of application No. 14/074,549, filed on Nov. 7, 2013, now Pat. No. 9,471,654.

(51) Int. Cl.
    *G06F 16/25* (2019.01)
    *G06F 16/22* (2019.01)
    *G06F 16/21* (2019.01)

(52) U.S. Cl.
    CPC .......... *G06F 16/258* (2019.01); *G06F 16/212* (2019.01); *G06F 16/221* (2019.01)

(58) Field of Classification Search
    CPC ..... G06F 16/258; G06F 16/212; G06F 16/221
    See application file for complete search history.

(56) References Cited

U.S. PATENT DOCUMENTS

| | | | |
|---|---|---|---|
| 5,819,251 A | 10/1998 | Kremer et al. | |
| 5,822,749 A | 10/1998 | Agarwal | |
| 7,516,115 B2 | 4/2009 | Gupta | |
| 7,725,501 B1 * | 5/2010 | Stillman | G06F 16/284 707/805 |
| 8,738,593 B2 | 5/2014 | Gupta | |
| 9,471,654 B1 | 10/2016 | Bradley | |
| 9,667,704 B1 | 5/2017 | Sonawane | |
| 9,886,483 B1 | 2/2018 | Harrison et al. | |
| 2001/0018684 A1 | 8/2001 | Mild et al. | |
| 2002/0059292 A1 | 5/2002 | Velasco | |

(Continued)

*Primary Examiner* — Kris E Mackes
(74) *Attorney, Agent, or Firm* — Patent Law Works LLP

(57) ABSTRACT

A system and method are disclosed for modeling a non-relational database as a normalized relational database. In one embodiment, the system identifies a column having a first type in a column-oriented, non-relational database; determines whether the column-oriented, non-relational database includes at least one column having a second type and identifies the one or more columns having the second type; virtually divides the column-oriented, non-relational database based on column type; and generates a normalized, relational model based on the virtual division of the column-oriented, non-relational database, the normalized, relational model including catalog information representing a parent table including the column having the first type and, when the column-oriented, non-relational database includes at least one column having the second type, catalogue information representing a child table, the parent table and child table both represented as relational tables.

18 Claims, 9 Drawing Sheets

(56) References Cited

U.S. PATENT DOCUMENTS

| | | |
|---|---|---|
| 2002/0099818 A1 | 7/2002 | Russell et al. |
| 2013/0166568 A1 | 6/2013 | Binkert et al. |
| 2013/0173664 A1 | 7/2013 | Xue et al. |
| 2015/0186819 A1 | 7/2015 | Patel et al. |
| 2015/0286747 A1 | 10/2015 | Anastasakos et al. |
| 2017/0052766 A1 | 2/2017 | Garipov |

* cited by examiner

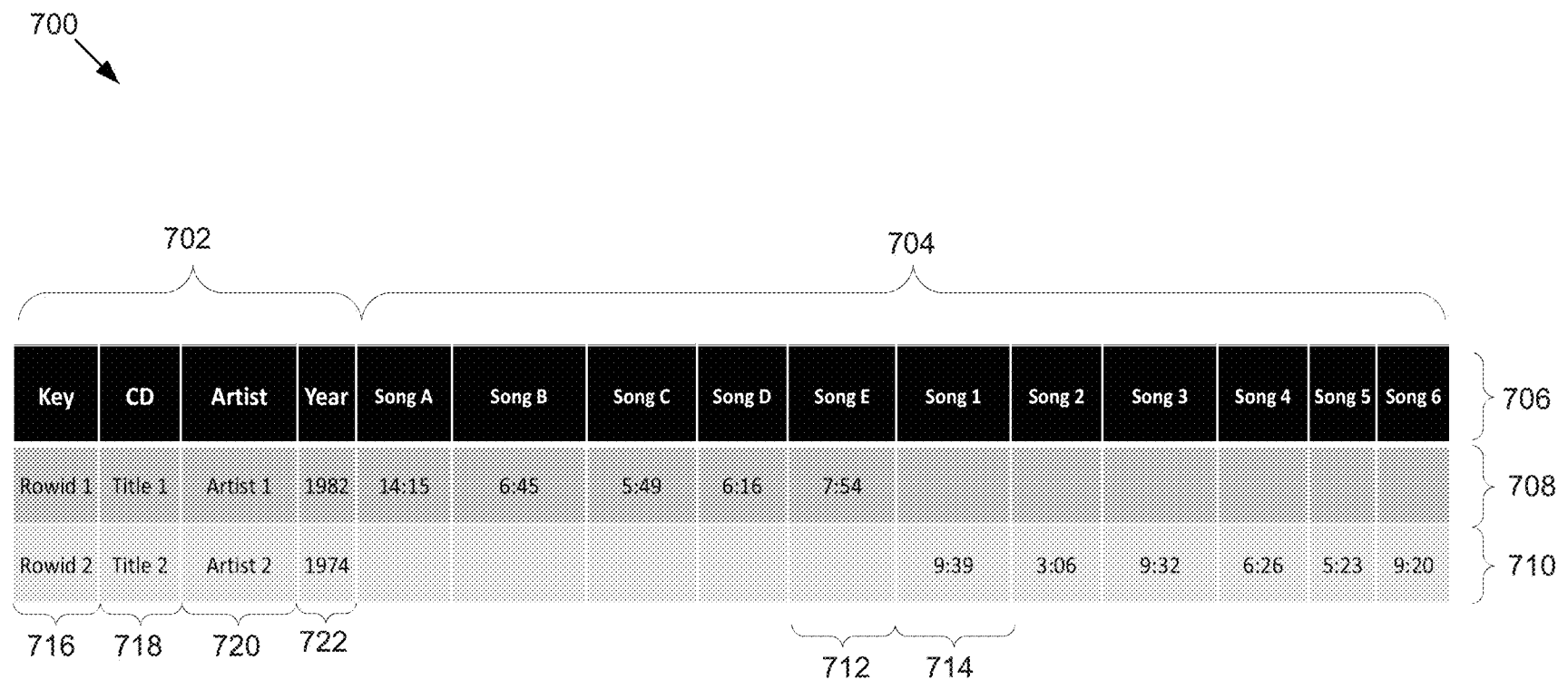

| Key | CD | Artist | Year | Song A | Song B | Song C | Song D | Song E | Song 1 | Song 2 | Song 3 | Song 4 | Song 5 | Song 6 |
|---|---|---|---|---|---|---|---|---|---|---|---|---|---|---|
| RowId 1 | Title 1 | Artist 1 | 1962 | 14:15 | 6:45 | 5:49 | 6:16 | 7:54 | 9:39 | | | | | |
| RowId 2 | Title 2 | Artist 2 | 1974 | | | | | | | 3:06 | 9:32 | 6:26 | 5:23 | 9:20 |

Figure 7

Table 800:

| Key | CD | Artist | Year |
|---|---|---|---|
| Rowid 1 | Title 1 | Artist 1 | 1982 |
| Rowid 2 | Title 2 | Artist 2 | 1974 |

Table 802:

| COL1 | COL2 | F_key |
|---|---|---|
| Song A | 14:15 | Rowid 1 |
| Song B | 6:45 | Rowid 1 |
| Song C | 5:49 | Rowid 1 |
| Song D | 6:16 | Rowid 1 |
| Song E | 7:54 | Rowid 1 |
| Song 1 | 9:39 | Rowid 2 |
| Song 2 | 3:06 | Rowid 2 |
| Song 3 | 9:32 | Rowid 2 |
| Song 4 | 6:26 | Rowid 2 |
| Song 5 | 5:23 | Rowid 2 |
| Song 6 | 9:20 | Rowid 2 |

Figure 8

| CD | Artist | Year | Song | Time |
|---|---|---|---|---|
| Title 1 | Artist 1 | 1982 | Song A | 14:15 |
| Title 1 | Artist 1 | 1982 | Song B | 6:45 |
| Title 1 | Artist 1 | 1982 | Song C | 5:49 |
| Title 1 | Artist 1 | 1982 | Song D | 6:16 |
| Title 1 | Artist 1 | 1982 | Song E | 7:54 |
| Title 2 | Artist 2 | 1974 | Song 1 | 9:39 |
| Title 2 | Artist 2 | 1974 | Song 2 | 3:06 |
| Title 2 | Artist 2 | 1974 | Song 3 | 9:32 |
| Title 2 | Artist 2 | 1974 | Song 4 | 6:26 |
| Title 2 | Artist 2 | 1974 | Song 5 | 5:23 |
| Title 2 | Artist 2 | 1974 | Song 6 | 9:20 |

Figure 9

MODELING OF A NON-RELATIONAL DATABASE AS A NORMALIZED RELATIONAL DATABASE

CROSS-REFERENCE TO RELATED APPLICATIONS

This application is a continuation of U.S. patent application Ser. No. 15/271,008, entitled "Modeling of a Non-Relational Database as a Normalized Relational Database," filed on Sep. 20, 2016, which is a continuation of U.S. patent application Ser. No. 14/074,549, entitled "Modeling of a Non-Relational Database as a Normalized Relational Database," filed on Nov. 7, 2013, the entirety of which is herein incorporated by reference. Applicants hereby notify the USPTO that the claims of the present application are different from those of the parent application and any other related application. Therefore, Applicants rescind any disclaimer of claim scope made in the parent application or any other predecessor application in relation to the present application. The Examiner is therefore advised that any such disclaimer and the cited reference that it was made to avoid may need to be revisited at this time. Furthermore, the Examiner is also reminded that any disclaimer made in the present application should not be read into or against the parent application or any other related application.

FIELD OF INVENTION

The present disclosure relates to modeling a non-relational database as a relational database. More specifically, the present disclosure relates to modeling a non-relational database as a normalized relational database.

BACKGROUND

Common drivers may use relational database query languages. For example, Open Database Connectivity (ODBC) and Java Database Connectivity (JDBC) drivers use Structured Query Language (SQL) as a query language. Relational database systems may normalize data by dividing data tables into smaller tables that are less redundant. For example, the relational table 900 of FIG. 9, when normalized, may be divided into table 1000 and table 1002 of FIG. 10. These smaller tables have relationships between them so that the original de-normalized data table 900 may be reconstructed. The objective of normalization is to reduce redundancies and ideally isolate data so that additions, deletions and modifications to a field may be made in just one table and propagated through the database using the defined relationships. In a relational model, different rows in the same table share the same set of columns. Non-relational databases do not follow the relational model. For example, Cassandra, a Not Only SQL (NoSQL) database, stores related data that is commonly accessed in the same row and different rows do not necessarily share the same set of columns. Therefore, Cassandra is a non-relational database.

Current methods and systems fail to adapt a non-relational data model to appear as a relational data model, which would allow standard drivers like ODBC and JDBC drivers to access the data stored in the non-relational model and make the data tables appear as if stored in a relational database to an application using the driver.

SUMMARY

In general, an innovative aspect of the subject matter described in this disclosure may be embodied in methods that include identifying, using one or more processors, a column having a first type in a column-oriented, non-relational database; determining, using one or more processors, whether the column-oriented, non-relational database includes at least one column having a second type; responsive to determining that column-oriented, non-relational database includes at least one column having the second type, identifying, using one or more processors, the one or more columns having the second type; virtually dividing, using one or more processors, the column-oriented, non-relational database based on column type, and generating, using one or more processors, a normalized, relational model of the column-oriented, non-relational database based on the virtual division of the column-oriented, non-relational database, the normalized, relational model including catalog information representing a parent table including the column having the first type and, when the column-oriented, non-relational database includes at least one column having the second type, catalogue information representing a child table, the parent table and child table both represented as relational tables.

According to one another innovative aspect of the subject matter described in this disclosure, a system comprises a processor; and a memory storing instructions that, when executed, cause the system to: identify a column having a first type in a column-oriented, non-relational database; determine whether the column-oriented, non-relational database includes at least one column having a second type; responsive to determining that column-oriented, non-relational database includes at least one column having the second type, identifying, using one or more processors, the one or more columns having the second type; virtually divide the column-oriented, non-relational database based on column type; and generate a normalized, relational model of the column-oriented, non-relational database based on the virtual division of the column-oriented, non-relational database, the normalized, relational model including catalog information representing a parent table including the column having the first type and, when the column-oriented, non-relational database includes at least one column having the second type, catalogue information representing a child table, the parent table and child table both represented as relational tables.

Other implementations of one or more of these aspects include corresponding systems, apparatus, and computer programs, configured to perform the actions of the methods, encoded on computer storage devices. These and other implementations may each optionally include one or more of the following features.

For instance, the catalogue information representing the parent table includes each column in the column-oriented, non-relational database having the first type. For instance, the column-oriented, non-relational database is a Cassandra database and uses Cassandra Query Language version 2. For instance, the column-oriented, non-relational database is a Cassandra database and uses Cassandra Query Language version 3. For instance, the one or more identified columns having the second type are represented as a separate child table in the normalized, relational model. For instance, the non-relational database table includes a plurality of columns having the second type and the relation model includes catalogue information representing at least two child tables including a first child table including a first set of the plurality of columns having the second type and a second child table including a second set of the plurality of columns having the second type. For instance, the operations further include receiving a relational query from a driver; retrieving the normalized, relational model of the column-oriented, non-relational database; mapping the relational query to associated fields and query language for the column-oriented, non-relational database using the normalized, relational model of the column-oriented, non-relational database; generating a non-relational query; and sending the non-relational query to the column-oriented, non-relational database. For instance, the driver is one of a Java Database Connectivity driver and an Open Database Connectivity driver. For instance, the operations further include receiving a non-relational response from the column-oriented, non-relational database; retrieving the normalized, relational model of the column-oriented, non-relational database; mapping the non-relational response to associated fields and query language for the a driver that uses a relational query language using the normalized, relational model of the column-oriented, non-relational database; generating a relational response; and sending the relational response to the driver that uses the relational language.

It should be understood that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

FIG. 7 is an example of a non-relational database table according to one embodiment.

FIG. 8 is an example of how data from a non-relational database table may be organized as one or more normalized relational database tables according to one embodiment.

FIG. 9 is an example of a de-normalized, relational database table according to one embodiment.

DETAILED DESCRIPTION

Figure 1:
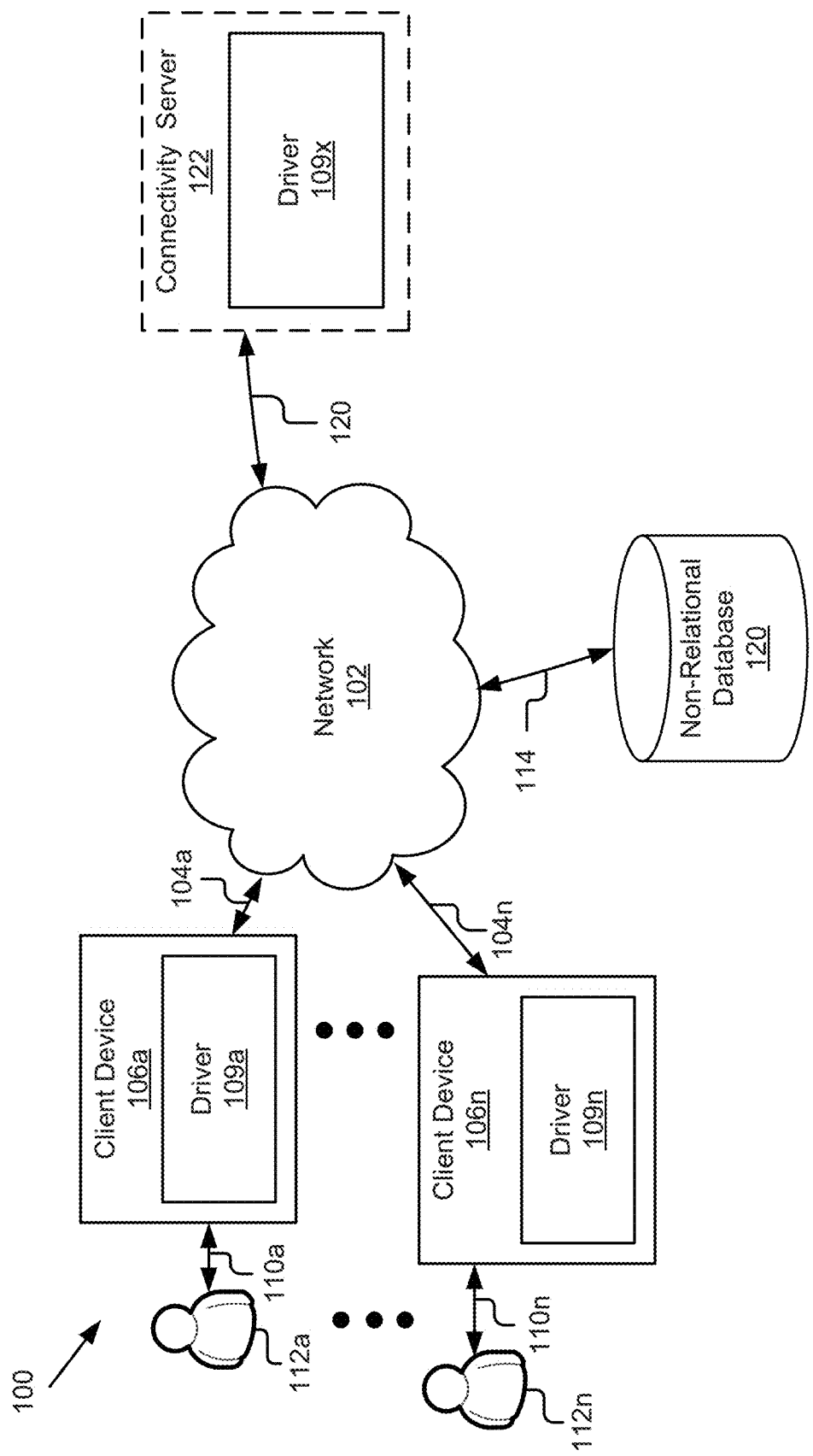
FIG. 1 is a block diagram illustrating an example system for modeling a non-relational database as a normalized relational database according to one embodiment.

FIG. 1 is a block diagram illustrating an example system 100 for modeling a non-relational database as a normalized relational database according to one embodiment. The illustrated system 100 includes client devices 106a . . . 106n, a non-relational database 120 and an optional connectivity server 122, which are communicatively coupled via a network 102 for interaction with one another. For example, the client devices 106a . . . 106n (also referred to individually and collectively as 106) may be respectively coupled to the network 102 via signal lines 104a . . . 104n and may be accessed by users 112a . . . 112n (also referred to individually and collectively as user 112) as illustrated by lines 110a . . . 110n. The non-relational database 120 may be coupled to the network 102 via signal line 114. The optional connectivity server 122 may be coupled to the network 102 via signal line 120. The use of the nomenclature "a" and "n" in the reference numbers indicates that any number of those elements having that nomenclature may be included in the system 100.

The network 102 may include any number of networks and/or network types. For example, the network 102 may include, but is not limited to, one or more local area networks (LANs), wide area networks (WANs) (e.g., the Internet), virtual private networks (VPNs), mobile networks (e.g., the cellular network), wireless wide area network (WWANs), Wi-Fi networks, WiMAX® networks, Bluetooth® communication networks, peer-to-peer networks, other interconnected data paths across which multiple devices may communicate, various combinations thereof, etc. Data transmitted by the network 102 may include packetized data (e.g., Internet Protocol (IP) data packets) that is routed to designated computing devices coupled to the network 102. In some implementations, the network 102 may include a combination of wired and wireless (e.g., terrestrial or satellite-based transceivers) networking software and/or hardware that interconnects the computing devices of the system 100. For example, the network 102 may include packet-switching devices that route the data packets to the various computing devices based on information included in a header of the data packets.

The data exchanged over the network 102 can be represented using technologies and/or formats including the hypertext markup language (HTML), the extensible markup language (XML), JavaScript Object Notation (JSON), Comma Separated Values (CSV), etc. In addition, all or some of links can be encrypted using conventional encryption technologies, for example, the secure sockets layer (SSL), Secure HTTP (HTTPS) and/or virtual private networks (VPNs) or Internet Protocol security (IPsec). In another embodiment, the entities can use custom and/or dedicated data communications technologies instead of, or in addition to, the ones described above. Depending upon the embodiment, the network 102 can also include links to other networks.

The client devices 106 are computing devices having data processing and communication capabilities. While FIG. 1 illustrates two client devices 106, the present specification applies to any system architecture having one or more client devices 106. In some embodiments, a client device 106 may include a processor (e.g., virtual, physical, etc.), a memory, a power source, a network interface, and may include other components whether software or hardware, such as a display, graphics processor, wireless transceivers, keyboard, camera, sensors, firmware, operating systems, drivers, various physical connection interfaces (e.g., USB, HDMI, etc.). The client devices 106a . . . 106n may couple to and communicate with one another and the other entities of the system 100 via the network 102 using a wireless and/or wired connection.

Examples of client devices 106 may include, but are not limited to, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While two or more client devices 106 are depicted in FIG. 1, the system 100 may include any number of client devices 106. In addition, the client devices 106a . . . 106n may be the same or different types of computing devices. In the depicted implementation, the client devices 106a . . . 106n respectively contain instances 109a . . . 109n of a driver 109.

The driver 109 may be storable in a memory and executable by a processor of a client device 106. In some embodiments, the client device 106 includes one or more applications (not shown) that use the driver 109. For example, the client device 106 includes an application (not shown) that uses driver 109 to access data in the non-relational database 120.

The optional connectivity server 122 may include one or more computing devices having data processing, storing, and communication capabilities. For example, the connectivity server 122 may include one or more hardware servers, server arrays, storage devices, systems, etc., and/or may be centralized or distributed/cloud-based. In some implementations, the connectivity server 122 may include one or more virtual servers, which operate in a host server environment and access the physical hardware of the host server including, for example, a processor, memory, storage, network interfaces, etc., via an abstraction layer (e.g., a virtual machine manager).

In one embodiment, the connectivity server 122 includes an instance of the driver 109x. For example, in one embodiment, a relational language based driver (e.g. a JDBC driver, an ODBC driver or any other driver that uses a relational query language) (not shown) of a client device 106 may send relational queries to the connectivity server 122 in a relational database language (e.g. SQL) and the driver 109x of the connectivity server 122 generates a relational model of the non-relational database 120 and translates the query for the non-relational database 120 and translates the response from the non-relational database 120 into the relational database language used by the relational language based driver (not shown). Such an embodiment may beneficially provide connectivity to a non-relational database as a web service using drivers designed for relational databases. In one embodiment, the connectivity server 122 provides client devices 106 and their applications (not shown) connectivity to a variety of hardware and services without the client device 106 including additional drivers. For example, connectivity server 122 may host driver 109x for exposing data stored in a non-relational database 120 as well as other drivers (not shown) that may expose an application (not shown) to other hardware and/or services using a JDBC or ODBC driver (not shown) on the client device 106.

The non-relational database 122 may include one or more non-transitory computer-readable mediums for storing data. While the illustrated non-relational database 122 is illustrated as connected to the network 102 via signal line 114, in some embodiments, the non-relational database 120 may be included in a memory or storage device (e.g. a hard disk drive) of the client device 106 or connected to (e.g. as a Direct Access Storage) a client device 106. In one embodiment, the non-relational database 120 includes a database management system (DBMS). For example, the DBMS may be a non-relational DBMS, for example, a NoSQL DMBS. In some instances, the DBMS may store data in multi-dimensional tables comprised of rows and columns, and manipulate, i.e., insert, query, update and/or delete, rows of data using programmatic operations. While only one relational database 120 is illustrated, it will be recognized that multiple non-relational databases 120 may exist. For example, in one embodiment, the non-relational database 120 is a distributed database.

In one embodiment, the non-relational database 120 is a NoSQL database. In one embodiment, the non-relational database 120 is a column-oriented NoSQL database. For example, in one embodiment, the non-relational database is a Cassandra database. For clarity and convenience, Cassandra is referred to and used in many of the examples herein. However, it will be recognized that Cassandra is merely one example of a column-oriented, non-relational database and that other examples exist and may be used without departing from the disclosure herein.

It should be understood that the system 100 illustrated in FIG. 1 is representative of an example system for modeling a non-relational database as a normalized relational database according to one embodiment and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system 100 may be integrated into to a single computing device or system or additional computing devices or systems, etc.

Figure 2:
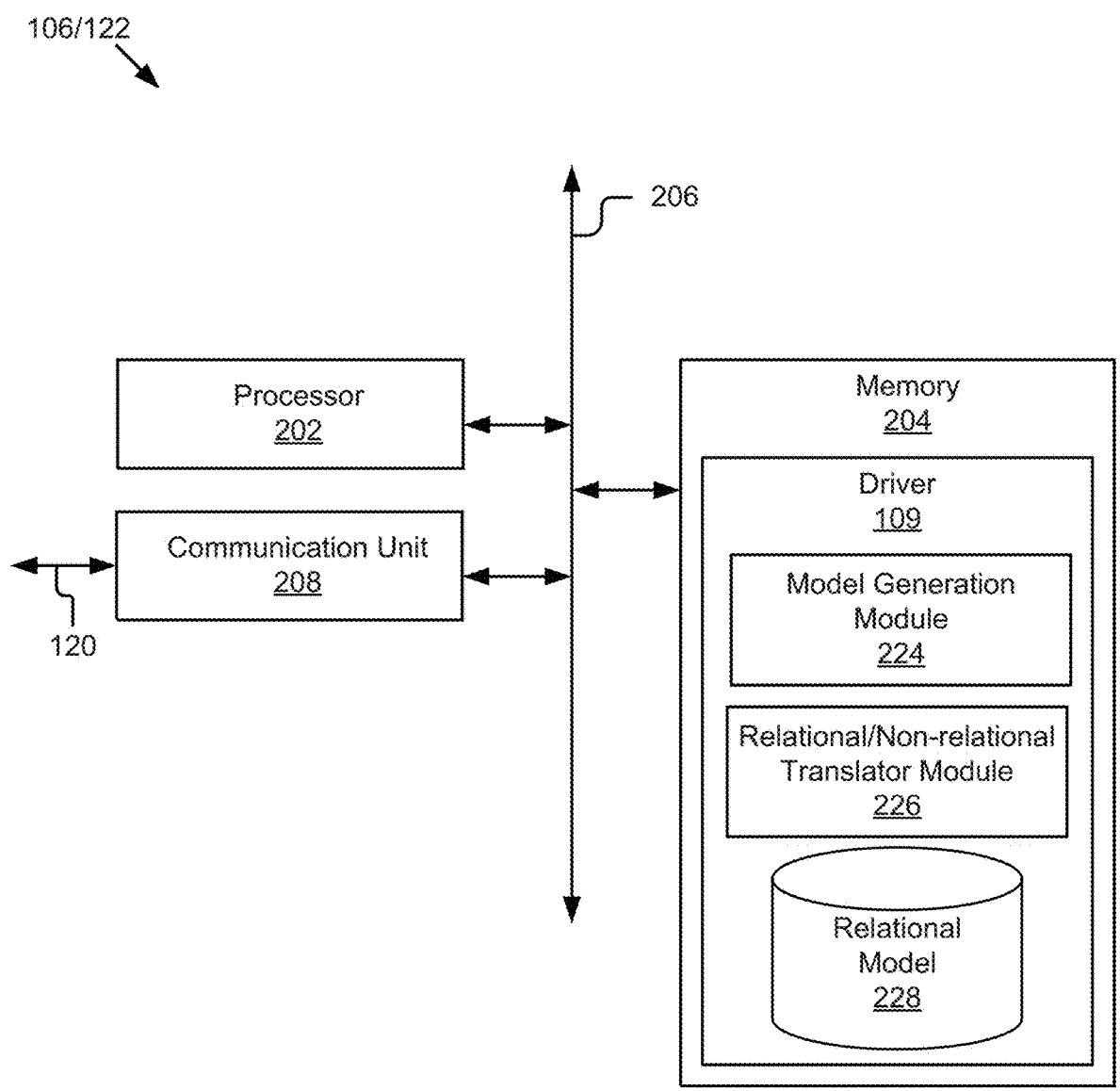
FIG. 2 is a block diagram illustrating an example computing device according to one embodiment.

FIG. 2 is a block diagram of an example computing device 106/122 according to one embodiment. The computing device 106/122, as illustrated, may include a processor 202, a memory 204 and a communication unit 208, which may be communicatively coupled by a communications bus 206. The computing device 106/122 depicted in FIG. 2 is provided by way of example and it should be understood that it may take other forms and include additional or fewer components without departing from the scope of the present disclosure. For example, while not shown, the computing device 106/122 may include a storage device, input and output devices (e.g., a display, a keyboard, a mouse, touch screen, speakers, etc.), various operating systems, sensors, additional processors, and other physical configurations. Additionally, it should be understood that the computer architecture depicted in FIG. 2 and described herein may be applied to multiple entities in a system 100, for example, the computing device 106/122 may be a client device 106 or a connectivity server 122.

The processor 202 may execute code, routines and software instructions by performing various input/output, logical, and/or mathematical operations. The processor 202 have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single core or plurality of processing units and/or cores. In some implementations, the processor 202 may be capable of generating and providing electronic display signals to a display device (not shown), supporting the display of images, capturing and transmitting images, performing complex tasks including various types of feature extraction and sampling, etc. In some implementations, the processor 202 may be coupled to the memory 204 via the bus 206 to access data and instructions therefrom and store data therein. The bus 206 may couple the processor 202 to the other components of the computing device 106/122 including, for example, the memory 204 and communication unit 208.

The memory 204 may store and provide access to data to the other components of the computing device 106/122. In some implementations, the memory 204 may store instructions and/or data that may be executed by the processor 202. For example, in the illustrated embodiment, the memory 204 may store the driver 109. The memory 204 is also capable of storing other instructions and data, including, for example, an operating system, hardware drivers, other software applications, databases, etc. The memory 204 may be coupled to the bus 206 for communication with the processor 202 and the other components of the computing device 106/122.

In the illustrated embodiment, the driver 109 includes a model generation module 224, a relational/non-relational translator module 226 and a relational model 228. In one embodiment, the model generation module 224 generates the relational model 228, and the relational/non-relational translator module 226 uses the relational model 228 to translate relational queries into non-relational queries and non-relational responses into relational responses. For example, in one embodiment, the model generation module 224 generates a normalized, relational model of a Cassandra table, the relational/non-relational translator module 226, upon receiving a SQL query from a JDBC or ODBC driver, obtains the normalized, relational model and translates the SQL query into a Cassandra Query Language (CQL) query and sends the CQL query to the Cassandra database. The Cassandra database returns a response using CQL, which the relational/non-relational translator module 226 receives and translates, using the normalized, relational model, into a SQL response, which is returned to the JDBC or ODBC driver.

In one embodiment, the driver 109 includes a relational language based driver (not shown). For example, in one embodiment, the driver 109 of the client device 106 includes one or more of a JDBC driver (not shown) and an ODBC driver (not shown) which may be included as a layer within the driver 109 of the client device 106. For example, the driver 109 includes a JDBC or ODBC driver layer that receives requests from an application (not shown), passes relational queries to the relational/non-relational translator module 226 based on the requests, receives a relational response from the relational/non-relational translator module 226 and returns a response to the application (not shown).

The memory 204 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 202. In some implementations, the memory 204 may include one or more of volatile memory and non-volatile memory. For example, the memory 204 may include, but is not limited to, one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory 204 may be a single device or may include multiple types of devices and configurations.

The bus 206 can include a communication bus for transferring data between components of a computing device 106/122 and/or between computing devices (e.g. between one or more of the client device 106, connectivity server 122 and non-relational database 120), a network bus system including the network 102 or portions thereof, a processor mesh, a combination thereof, etc. In some implementations, the driver 109, its sub-components 224, 226, 228, their subcomponents 322, 324, 326, 328, 330, 422, 424 and various other software operating on the computing device 106/122 (e.g., an operating system, etc.) may cooperate and communicate via a software communication mechanism implemented in association with the bus 206. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 208 may include one or more interface devices (I/F) for wired and/or wireless connectivity with the network 102. For instance, the communication unit 208 may include, but is not limited to, CAT-type interfaces; wireless transceivers for sending and receiving signals using radio transceivers (4G, 3G, 2G, etc.) for communication with the mobile network 102, and radio transceivers for Wi-Fi™ and close-proximity (e.g., Bluetooth®, NFC, etc.) connectivity, etc.; USB interfaces; various combinations thereof; etc. In some implementations, the communication unit 208 can link the processor 202 to the network 102, which may in turn be coupled to other processing systems. The communication unit 208 can provide other connections to the network 102 and to other entities of the system 100 using various standard network communication protocols.

As mentioned above, the computing device 106/122 may include other and/or fewer components. Examples of other components may include a display, an input device, a sensor, etc. (not shown). In one embodiment, the computing device 106/122 includes a display. The display may display electronic images and data for presentation to a user 112. The display may include any conventional display device, monitor or screen, including, for example, an organic light-emitting diode (OLED) display, a liquid crystal display (LCD), etc. In some implementations, the display may be a touch-screen display capable of receiving input from a stylus, one or more fingers of a user 112, etc. For example, the display may be a capacitive touch-screen display capable of detecting and interpreting multiple points of contact with the display surface.

The input device (not shown) may include any device for inputting information into the computing device 106/122. In some implementations, the input device may include one or more peripheral devices. For example, the input device may include a keyboard (e.g., a QWERTY keyboard or keyboard in any other language), a pointing device (e.g., a mouse or touchpad), microphone, an image/video capture device (e.g., camera), etc. In some implementations, the input device may include a touch-screen display capable of receiving input from the one or more fingers of the user 112. For example, the user 112 could interact with an emulated (i.e., virtual or soft) keyboard displayed on the touch-screen display by using fingers to contacting the display in the keyboard regions.

Example Virtual Model Generation Module 224

Figure 3:
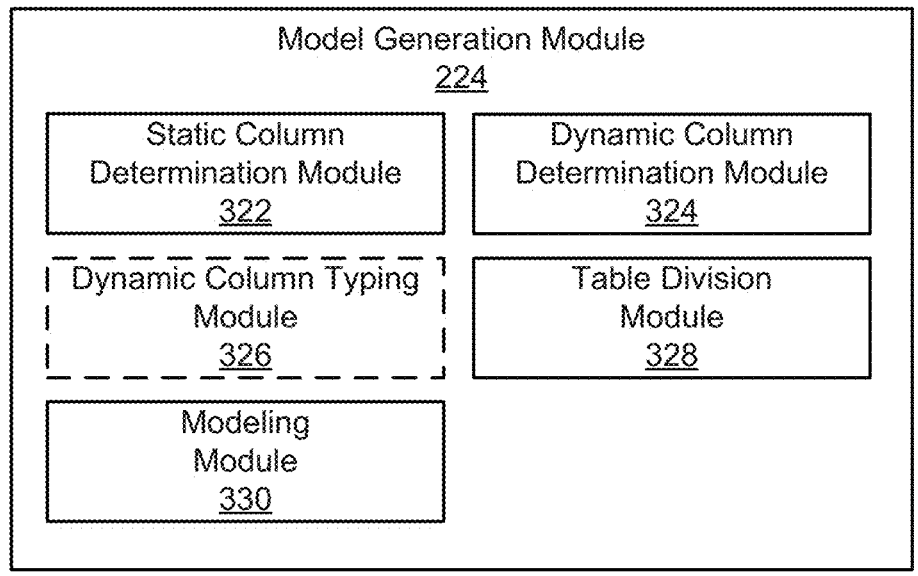
FIG. 3 is a block diagram of a model generation module according to one embodiment.

Referring now to FIG. 3, the model generation module 224 is shown in more detail according to one embodiment. FIG. 3 is a block diagram of the model generation module 224 included in a computing device 106/122 according to one embodiment.

The model generation module 224 generates a relational model 228 of a non-relational database 120, which may be used by the relational/non-relational translator module 226 to expose the data in the non-relational database 120 to access by drivers using a relational query language. For clarity and convenience, an example of a non-relational database table 700 is provided in FIG. 7 and the functionality of the model generation module 224 and its subcomponents 322, 324, 326, 328, 330 are discussed with reference to non-relational database table 700. In one embodiment, the non-relational database table 700 is a column-oriented, non-relational database table (e.g. using Cassandra). It should be recognized that non-relational database table 700 is merely one example of a non-relational database table and others exist.

Depending on the embodiment, the model generation module 224 may generate the relational model responsive to one or more of an establishment of a connection with the non-relational database 120, a schema modifying update and the expiration of a period. For example, in one embodiment, the model generation module 224 generates the relational model 228 responsive to the driver 109 connecting to the non-relational database 120. In another example, in one embodiment, the model generation module 224 generates the relational model 228 responsive to receiving a schema modifying update. A schema modifying request is a request that modifies the non-relational database 120 in a manner that affects the relational model 228. For example, in one embodiment, the model generation module 228 generates a relational model 228 responsive to determining that a column has been added/removed from the non-relational database 120. In yet another example, in one embodiment, the model generation module 224 generates the relational model 228 periodically (e.g. every X units of time, every Y queries, every Z type of query, etc.). Such embodiments may ensure that the relational model remains current and reflects updates to the non-relational database 120.

In one embodiment, the non-relational database 120 is a column-oriented database. In some embodiments, a column-oriented, non-relational database may have multiple column types. For example, the column-oriented non-relational database may have one or more columns of a first type that are more relational in nature (e.g. shared by all rows) and zero or more columns of a second type that are not relational in nature. The first type of column (i.e. the column type that is more relational in nature) is occasionally referred to herein as a static column. The second type of column (i.e. the column type that is not relational in nature) is occasionally referred to herein as a dynamic column.

In one embodiment, the model generation module 224 comprises a static column determination module 322, a dynamic column determination module 324, an optional dynamic column typing module 326, a table division module 328 and a modeling module 330. It will be recognized that the modules 322, 324, 326, 328, 330 comprised in the model generation module 224 are not necessarily all on the same computing device 106/122. In one embodiment, the modules 322, 324, 326, 328, 330 and/or their functionality are distributed across multiple computing devices 106/122. For example, in one embodiment, the modules 322, 324, 326, 328, 330, 332 are distributed across multiple connectivity servers 122.

The static column determination module 322 includes code and routines for identifying a static column in the non-relational database table. In one embodiment, the static column determination module 322 is a set of instructions executable by the processor 202. In another embodiment, the static column determination module 322 is stored in the memory 204 and is accessible and executable by the processor 202. In either embodiment, the static column determination module 322 is adapted for cooperation and communication with the processor 202, other components of the computing device 106/122 and other components of the model generation module 224.

The static column determination module 322 identifies static columns in the non-relational database table. In some embodiments, a static column includes a column that is shared by all rows in the table and is, therefore, relational in nature. For example, the column that includes a key for each row in the non-relational database table is a static column. In one embodiment, a static column may be shared by all rows in the table, but each row is not required to have the column defined. In one embodiment, a static column is a static column as defined by Cassandra. In one embodiment, a non-relational database 120 includes at least one static column. For example, in one embodiment, a non-relational database includes a column for a key for each row in the non-relational database table and that key column is a static column.

In one embodiment, the static column determination module 322 identifies static columns in the non-relational database table explicitly. In one embodiment, the static column determination module 322 identifies static columns in the non-relational database table explicitly using the definition of the non-relational database table. For example, referring to FIG. 7, assume that table 700 is titled MusicCDs, in one embodiment, the static columns 702 are defined upon creation of the table to be the Key 716, CD 718, Artist 720 and Year 722 columns. For example, using CQL version 2, assume the MusicCDs table 700 is created using the command "CREATE TABLE MusicCDs (UUID PRIMARY KEY, CD varchar, Artist varchar, Year int);" in one embodiment, the static column determination module 322 determines that KEY, CD, Artist and Year are the static columns of table 700 from this definition. In another example, using CQL version 3, assume the MusicCDs table 700 is created using the command "CREATE TABLE MusicCDs (UUID PRIMARY KEY, CD varchar, Artist varchar, Year int, Songs map<varchar, varchar>);" in one embodiment, the static column determination module 322 determines that KEY, CD, Artist and Year are the static columns of table 700 from this definition.

In one embodiment, the static column determination module 322 identifies static columns in the non-relational database table implicitly. Examples of implicit determination include but are not limited to determination based on the organization and location of the columns (e.g. left most columns may be more likely to be static columns), based on how many rows share the column (e.g. whether all or nearly all rows define the column), etc.

Referring again to FIG. 3, in one embodiment, the static column determination module 322 passes the identity of the static columns to the table division module 328. In one embodiment, the static column determination module 322 stores the information identifying the identified static columns in memory 204 (or any other non-transitory storage medium communicatively accessible). The other modules of the model generation module 224 including, e.g., the table division module 328, may retrieve the identity of the static columns from the memory 204 (or other non-transitory storage medium).

The dynamic column determination module 324 includes code and routines for identifying a dynamic column in a non-relational database. In one embodiment, the dynamic column determination module 324 is a set of instructions executable by the processor 202. In another embodiment, the dynamic column determination module 324 is stored in the memory 204 and is accessible and executable by the processor 202. In either embodiment, the dynamic column determination module 324 is adapted for cooperation and communication with the processor 202, other components of the computing device 106/122 and other components of the model generation module 224.

The dynamic column determination module 324 identifies dynamic columns in the non-relational database table. In one embodiment, a dynamic column is a column that is not relational in nature. For example a dynamic column that is not shared by all rows. For example, referring, again, to table 700 of FIG. 7, the column for "Song E" 712 is defined for the first row 708, but not for the second row 710. In one embodiment, a dynamic column is a dynamic column as defined by Cassandra.

In one embodiment, a non-relational database table may include zero or more dynamic columns. In other words, in some embodiments, a non-relational database table does not necessarily include a dynamic column. In one embodiment, the dynamic column determination module 324 determines whether the non-relational database table includes one or more dynamic columns.

In one embodiment, the dynamic column determination module 324 determines whether at least one dynamic column exists by comparing the columns in the non-relational table to that table's definition. For example, as described above with reference to FIG. 7, the MusicCDs table may be created using a CQL version 2 command "CREATE TABLE MusicCDs (UUID PRIMARY KEY, CD varchar, Artist varchar, Year int);" and, in one embodiment, the dynamic column determination module 324 may compare the columns of table 700 to the columns defined in table creation and determine that dynamic columns 704 are present in table 700. For example, the dynamic column determination module 324 determines whether columns exist in table 700 that were not defined at table creation because CQL versions 2 and 3 permit the addition and removal of dynamic columns as needed without such definition.

In one embodiment, the dynamic column determination module 324 determines whether at least one dynamic column exists by analyzing the table definition for inclusion of a dynamic column type. For example, as described above with reference to FIG. 7, the MusicCDs table may be created using a CQL version 3 command "CREATE TABLE MusicCDs (UUID PRIMARY KEY, CD varchar, Artist varchar, Year int, Songs map<varchar, varchar>);" in one embodiment, the dynamic column determination module 324 determines that the MusicCDs table includes one or more dynamic columns based on the definition including a dynamic column type (i.e. a map). Examples of a dynamic column types may include one or more of a set, a list and a map as defined by CQL version 3. A dynamic column type is occasionally referred to a column "sub-type" as it is a sub-type of the second column type according to one embodiment.

The dynamic column determination module 324 identifies dynamic columns in the non-relational database table. In one embodiment, there are two column types (e.g. static and dynamic). In one such embodiment, the dynamic column determination module 324 identifies the zero or more columns that are not identified as static columns as dynamic columns.

In one embodiment, the dynamic column determination module 324 passes the identity of dynamic columns to one or more of the optional dynamic column typing module 326 and the table division module 328. In one embodiment, the dynamic column determination module 324 stores the information identifying the dynamic columns in memory 204 (or any other non-transitory storage medium communicatively accessible). The other modules of the model generation module 224 including, e.g., the dynamic column typing module 326 and/or the table division module 328, may retrieve the identity of the dynamic columns by accessing the memory 204 (or other non-transitory storage medium).

As mentioned above, in some embodiments, one or more dynamic columns may be associated with a sub-type. For example, in CQL version 3, dynamic column sub-types may include sets, lists and maps. In some embodiments, the dynamic columns are identified based on sub-type by the optional dynamic column typing module 326.

The dynamic column typing module 326 includes code and routines for identifying dynamic columns in a non-relational database based on a sub-type. In one embodiment, the dynamic column typing module 326 is a set of instructions executable by the processor 202. In another embodiment, the dynamic column typing module 326 is stored in the memory 204 and is accessible and executable by the processor 202. In either embodiment, the dynamic column typing module 326 is adapted for cooperation and communication with the processor 202, other components of the computing device 106/122 and other components of the model generation module 224.

The dynamic column typing module 326 identifies dynamic columns in a non-relational database based on a sub-type. In one embodiment, the dynamic column typing module 326 identifies the dynamic columns associated with different sub-types. For example, assume a table is created using a CQL version 3 command "CREATE TABLE MusicCDs (UUID PRIMARY KEY, CD varchar, Artist varchar, Year int, Songs map<varchar, varchar>, BandMemebers list<text>);". That table may look similar to table 700 where columns 704 are dynamic columns associated with the "Songs" map (e.g. the "Songs" map includes Songs A-B and Songs 1-6 as song title values and the track length values associated with each song title), but that table would also include one or more additional dynamic columns (not shown) associated with headers in row 706 that include band member names. In one embodiment, the dynamic column typing module 326 identifies the columns associated with the Song columns 704 as associated with a first sub-type (i.e. a map) and the columns associated with the band members (not shown) as associated with a second sub-type (i.e. a list) differently.

In one embodiment, the dynamic column typing module 326 identifies the dynamic columns associated with the same sub-type similarly. For example, assume a table is created using a CQL version 3 command "CREATE TABLE MusicCDs (UUID PRIMARY KEY, CD varchar, Artist varchar, Year int, Songs map<varchar, varchar>, SecondMap map<varchar, varchar>);". Again, that table may look similar to table 700 where columns 704 are dynamic columns associated with the "Songs" map, but that table would also include one or more additional dynamic columns (not shown) associated with the "SecondMap" map. In one embodiment, the dynamic column typing module 326 identifies the columns associated with the second map (not shown) and the Song columns 704 similarly as both are associated with a common sub-type (i.e. a map).

In one embodiment, the dynamic column typing module 326 identifies dynamic columns associated with the same sub-type differently. For example, in the example immediately above, the dynamic column typing module 326 identifies the Song columns 704 as a first set of dynamic columns associated with a first map (i.e. "Songs" map), and identifies a second set of dynamic columns associated with a second map (i.e. "SecondMap" map).

In one embodiment, the dynamic column typing module 326 passes the identification based on sub-type to the table division module 328. In one embodiment, the dynamic column typing module 326 stores the identification based on sub-type in memory 204 (or any other non-transitory storage medium communicatively accessible). The other modules of the model generation module 224 including, e.g., the dynamic column typing module 326, may retrieve the identification based on sub-type by accessing the memory 204 (or other non-transitory storage medium).

The table division module 328 includes code and routines for dividing the non-relational database table. In one embodiment, the table division module 328 is a set of instructions executable by the processor 202. In another embodiment, the table division module 328 is stored in the memory 204 and is accessible and executable by the processor 202. In either embodiment, the table division module 328 is adapted for cooperation and communication with the processor 202, other components of the computing device 106/122 and other components of the model generation module 224.

The table division module 328 divides the non-relational database table. In one embodiment, the table division module 328 divides the non-relational database table based on the column identifications by the static column determination module 322, the dynamic column determination module and, optionally, the dynamic column typing module 326. In one embodiment, when no dynamic columns are included in the non-relational database table, the table division module 328 does not perform division of the non-relational database table.

In one embodiment, the table division module 328 divides the non-relational database table "virtually," i.e., the table division module 328 does not modify the schema or divide the non-relational table stored in the non-relational database. Rather, in one embodiment, the table division module 328 determines how the non-relational database may be divided into sections that may be represented as separate tables in a normalized, relational model.

In one embodiment, the table division module 328 divides the non-relational database table based on column type. For example, referring again to table 700 of FIG. 7, in one embodiment, the table division module 328 divides the table 700 into static columns 702 and dynamic columns 704 based on the identification of columns as static or dynamic.

In one embodiment, the table division module 328 further divides the dynamic columns based on sub-type. For example, assume the non-relational table includes dynamic columns associated with one or more sets and dynamic columns associated with one or more maps; in one embodiment, the table division module 328 divides the dynamic columns into a set of dynamic columns associated with the one or more sets and a set of dynamic columns associated with the one or more maps.

In one embodiment, the table division module 328 divides among the same sub-type. For example, assume the non-relational table includes columns associated with a first map and columns associated with a second map, in one embodiment, the table division module 328 divides the dynamic columns into a set of dynamic columns associated with the first map and a set of dynamic columns associated with the second map.

In one embodiment, the table division module 328 passes the divided table to the modeling module 330. For example, the table division module 328 is communicatively coupled to the modeling module 330 to send the divided table to the modeling module 330. In another embodiment, the table division module 328 stores the divided table in memory 204 (or any other non-transitory storage medium communicatively accessible), and the modeling module 330 may retrieve the divided table by accessing the memory 204 (or other non-transitory storage medium).

The modeling module 330 includes code and routines for generating a relational model of the non-relational database table. In one embodiment, the modeling module 330 is a set of instructions executable by the processor 202. In another embodiment, the modeling module 330 is stored in the memory 204 and is accessible and executable by the processor 202. In either embodiment, the modeling module 330 is adapted for cooperation and communication with the processor 202, other components of the computing device 106/122 and other components of the model generation module 224.

The modeling module 330 generates a relational model of the non-relational database table. The generation of the relational model does not affect how the data is organized or stored in the non-relational database. In some embodiments, the relational model does not include the data of the non-relational database table. For example, in one embodiment, the relational model includes catalogue information for representing one or more relational tables. The tables represented by the catalogue information may occasionally be referred to herein as "virtual tables, "virtual, relational tables" "normalized, virtual relational tables" or the like. Catalogue information represents a relational database table by describing how at least one of a row, a column and a field of the non-relational database table would be represented as, or mapped to, a relational database table.

For example, FIG. 8 illustrates how the data from the non-relational database table 700 of FIG. 7 may be reorganized and represented as normalized, relational database tables 800 and 802 according to one embodiment. In one embodiment, the relational model for table 700 may not include the normalized, relational tables 800 and 802 themselves but describes how the columns of non-relational table 700 may be reorganized into the normalized, relational tables 800 and 802. For example, the relational model includes catalog information describing how the static columns 702 of the non-relational table 700 are mapped to a virtual parent table 802, how the dynamic columns 704 of the non-relational table 700 are mapped to the virtual child table 802 by flipping the columns on their side (i.e. into rows) and how the rows of the virtual child table 802 are related to the rows of the virtual parent table 800 by a virtual foreign key.

The modeling module 330 generates a relational model of the non-relational database table based on the table division. In one embodiment, the modeling module 330 generates catalogue information representing a separate relational table for each portion of the divided, non-relational database table. Because the non-relational database table is represented by more than one relational table in the relational model (assuming the non-relational database table includes at least on dynamic table), the relational model is occasionally referred to herein as a normalized, relational model.

In one embodiment, the modeling module 330 creates a relational model that includes catalogue information for a table based on the one or more static columns of the non-relational database. For example, in one embodiment, the relational model includes catalogue information representing a relational table that includes all the static columns of the non-relational database table. In one embodiment, the relational table based on the static columns is the parent table for the relational model and is related to zero or more child tables using foreign key pairing.

In one embodiment, when the non-relational database table includes one or more dynamic columns, the catalogue information of the relational model represents the dynamic columns in a child table. In one embodiment, the catalogue information represents all dynamic columns of the non-relational database table in a single child table. For example, assume, again, that the non-relational database table uses CQL version 2 and that CQL version 2 does not identify sub-types of dynamic columns. In one embodiment, the modeling module 330 generates catalogue information representing a single child table that includes (possibly rearranged) all the dynamic columns of such a non-relational database.

In one embodiment, the catalogue information represents all dynamic columns of a common sub-type in the non-relational database table in the same child table. For example, assume, again, that the non-relational database table uses CQL version 3 and that CQL version 3 defines lists, sets and maps as sub-types of dynamic columns. In one embodiment, the modeling module 330 generates catalogue information representing a first child table including all the dynamic columns that are lists (if any), catalogue information representing a second child table that includes all the dynamic columns that are sets (if any) and catalogue information that represents a third child table including all the dynamic columns that are maps (if any).

In one embodiment, the catalogue information represents different groups of dynamic columns having a common sub-type in the non-relational database table in separate child tables. For example, assume, again, that the non-relational database table uses CQL version 3 and that CQL version 3 defines lists, sets and maps as sub-types of dynamic columns. Also, assume that the non-relational table includes one or more dynamic columns associated with a first map and one or more dynamic columns associated with a second map. In one embodiment, the modeling module 330 generates catalogue information that represents all the dynamic columns that are associated with the first map in a first child table and catalogue information that represents all the dynamic columns that are associated with the second map in a second child table.

In one embodiment, the naming convention of the virtual tables in the relational model and the columns therein uses a default naming convention. In one embodiment, the default naming convention may be user modifiable.

In one embodiment, the modeling module 330 passes the relational model to the relational/non-relational translator module 226. For example, the modeling module 330 is communicatively coupled to the relational/non-relational translator module 226 to send the relational model to the relational/non-relational translator module 226. In another embodiment, the modeling module 330 stores the relational model in memory 204 (or any other non-transitory storage medium communicatively accessible), and the relational/non-relational translator module 226 may retrieve the relational model by accessing the memory 204 (or other non-transitory storage medium).

Example Relational/Non-Relational Translator Module 226

Figure 4:
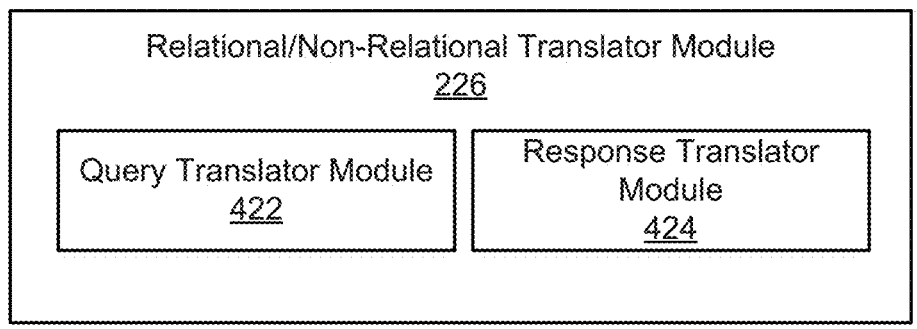
FIG. 4 is a block diagram of a relational/non-relational translator module according to one embodiment.

Referring now to FIG. 4, the relational/non-relational translator module 226 is shown in more detail according to one embodiment. FIG. 4 is a block diagram of the relational/non-relational translator module 226 included in a computing device 106/122 according to one embodiment.

The relational/non-relational translator module 226 provides translation between a relational query language and the non-relational query language of the non-relational database. In one embodiment, the relational/non-relational translator module 226 uses the relational model to provide translation between a relational query language and the non-relational query language of the non-relational database. For example, in one embodiment, the relational/non-relational translator module 226 provides translation from SQL to CQL and from CQL to SQL for a query. Such embodiments, may beneficially allow drivers (e.g. ODBC, JDBC, etc. drivers) and applications that are designed to interface with and interact with relational databases to interact with a non-relational database as if it were a relational database. In other words, the relational/non-relational translator module 226 provides translation so that the application and/or relational driver "see" the database as a relational database and the non-relational database "sees" only non-relational queries.

The query translator module 422 includes code and routines for receiving a relational query, translating the relational query into a non-relational query and sending the non-relational query the non-relational database. In one embodiment, the query translator module 422 is a set of instructions executable by the processor 202. In another embodiment, the query translator module 422 is stored in the memory 204 and is accessible and executable by the processor 202. In either embodiment, the query translator module 422 is adapted for cooperation and communication with the processor 202, other components of the computing device 106/122 and other components of the model generation module 224.

The query translator module 422 receives a relational query. In one embodiment, a relational query is a query that uses a relational database language. For example, in one embodiment, the query translator module 422 receives a SQL query from an ODBC or JDBC driver to add, retrieve, modify or manipulate data.

The query translator module 422 obtains the relational model and translates the relational query into a non-relational query using the relational model. In one embodiment, the query translator module 422 translates the relational query into a non-relational query by mapping any fields, rows, columns, etc. referenced in the relational query (which correspond to fields, rows, columns of one or more the virtual tables of the relational model) to the non-relational table using the catalogue information and by translating the query into the appropriate non-relational query and sends the non-relational query to the non-relational database.

In one embodiment, the query translator module 422 passes the non-relational query to the non-relational database 120. For example, the query translator module 422 is communicatively coupled to the non-relational database 120 to send the non-relational query to the non-relational database 120.

The response translator module 424 includes code and routines for receiving a non-relational response from the non-relational database, translating the non-relational response into a relational response and sending the relational response. In one embodiment, the response translator module 424 is a set of instructions executable by the processor 202. In another embodiment, the response translator module 424 is stored in the memory 204 and is accessible and executable by the processor 202. In either embodiment, the response translator module 424 is adapted for cooperation and communication with the processor 202, other components of the computing device 106/122 and other components of the model generation module 224.

The response translator module 424 receives a non-relational response. In one embodiment, a non-relational response is a response in a non-relational database language. For example, in one embodiment, the response translator module 424 receives a CQL response from the non-relational database to a CQL query.

The response translator module 424 obtains the relational model and translates the non-relational response into a relational response using the relational model. In one embodiment, the response translator module 424 uses the catalogue information of the relational model to map any fields, rows, columns, etc. of the non-relational response to corresponding fields, rows, columns, etc. of the one or more the virtual relational tables and by translating the response into the appropriate relational response and sends the relational response to the requesting driver and/or application.

In one embodiment, the response translator module 424 passes the relational response to the requesting driver and/or application. For example, the response translator module 424 is communicatively coupled to the requesting driver and/or application to send the relational response to the requesting driver and/or application.

Example Methods

Figure 5:
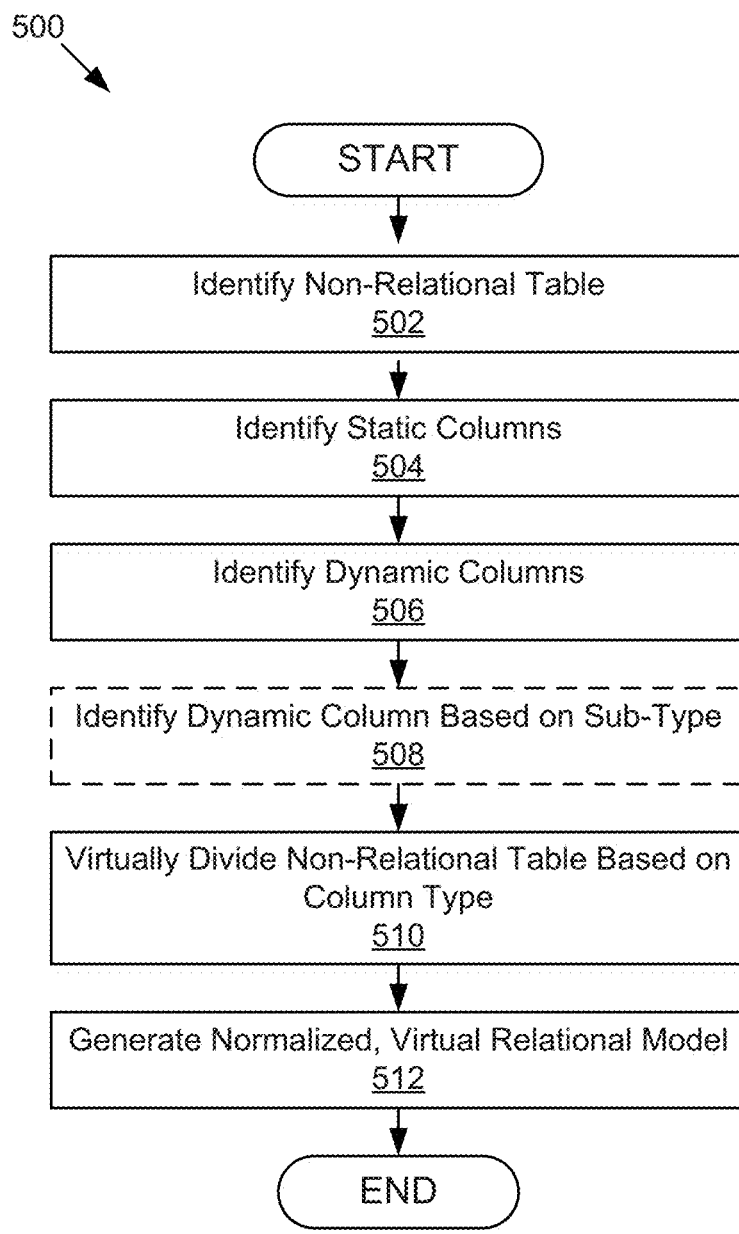
FIG. 5 is a flowchart of an example method for generating a model of a non-relational database as a normalized relational database according to one embodiment.

FIG. 5 depicts method 500 performed by the system described above in reference to FIGS. 1-3. The method 500 begins at block 502. At block 502, the model generation module 224 identifies a non-relational table to be modeled as one or more normalized, relational tables. At block 504, the static column determination module 322 identifies static columns in the non-relational table identified at block 502. At block 506, the dynamic column determination module 324 identifies dynamic columns in the non-relational table.

Depending on the embodiment, the non-relational database may support a plurality of different dynamic column types. In embodiments that do not support different dynamic column types, the method may continue at block 510. In some embodiments that support different dynamic column types, the method continues at block 508 before proceeding to block 510. At block 508, the optional dynamic column typing module 326 identifies dynamic columns based on sub-type. At block 510, the table division module 328 virtually divides the non-relational table based on column type (which may include sub-type depending on the embodiment). At block 512, the modeling module 330 generates a normalized, virtual relational model.

Figure 6:
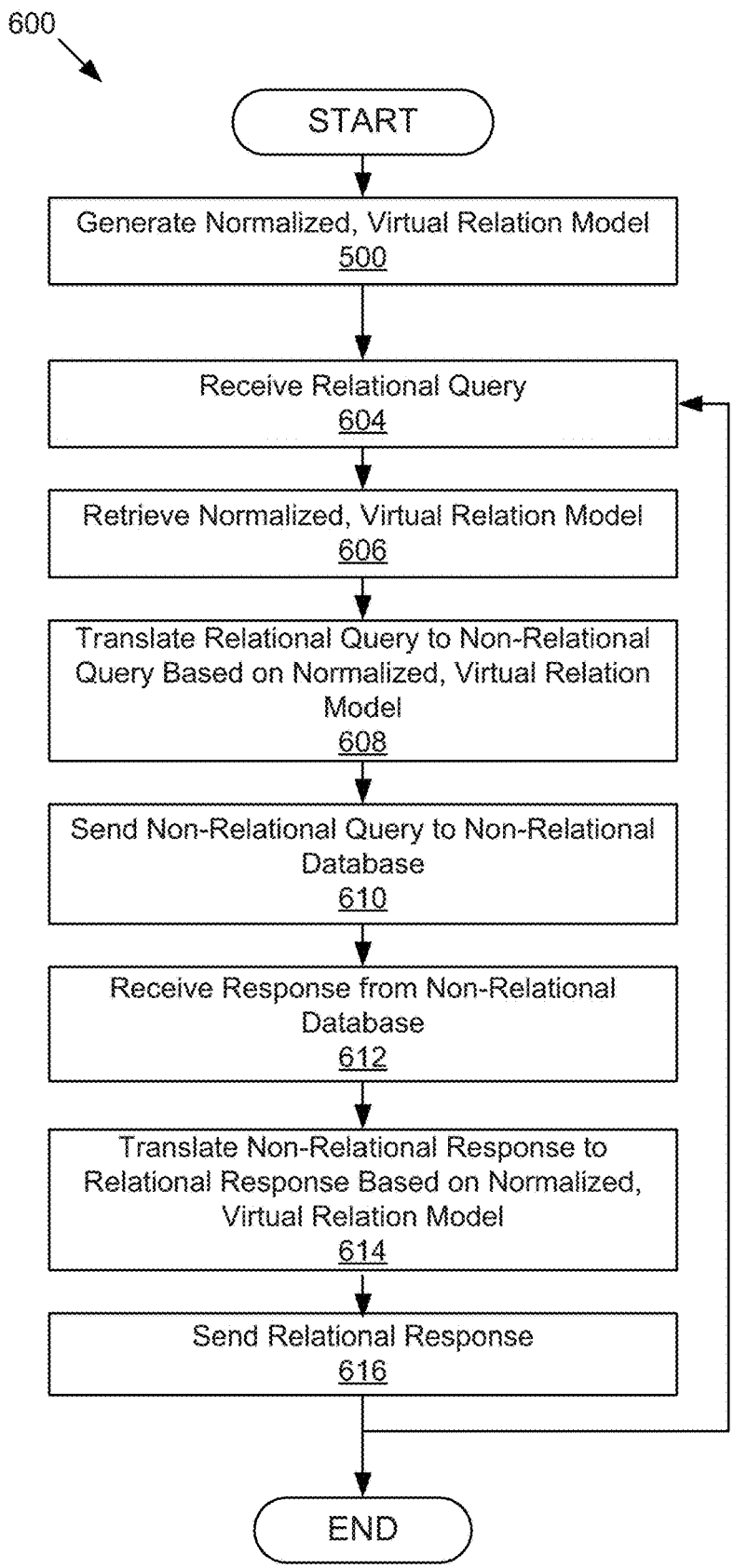
FIG. 6 is a flowchart of an example method using a model of a non-relational database as a normalized relational database according to one embodiment.
Figure 10:
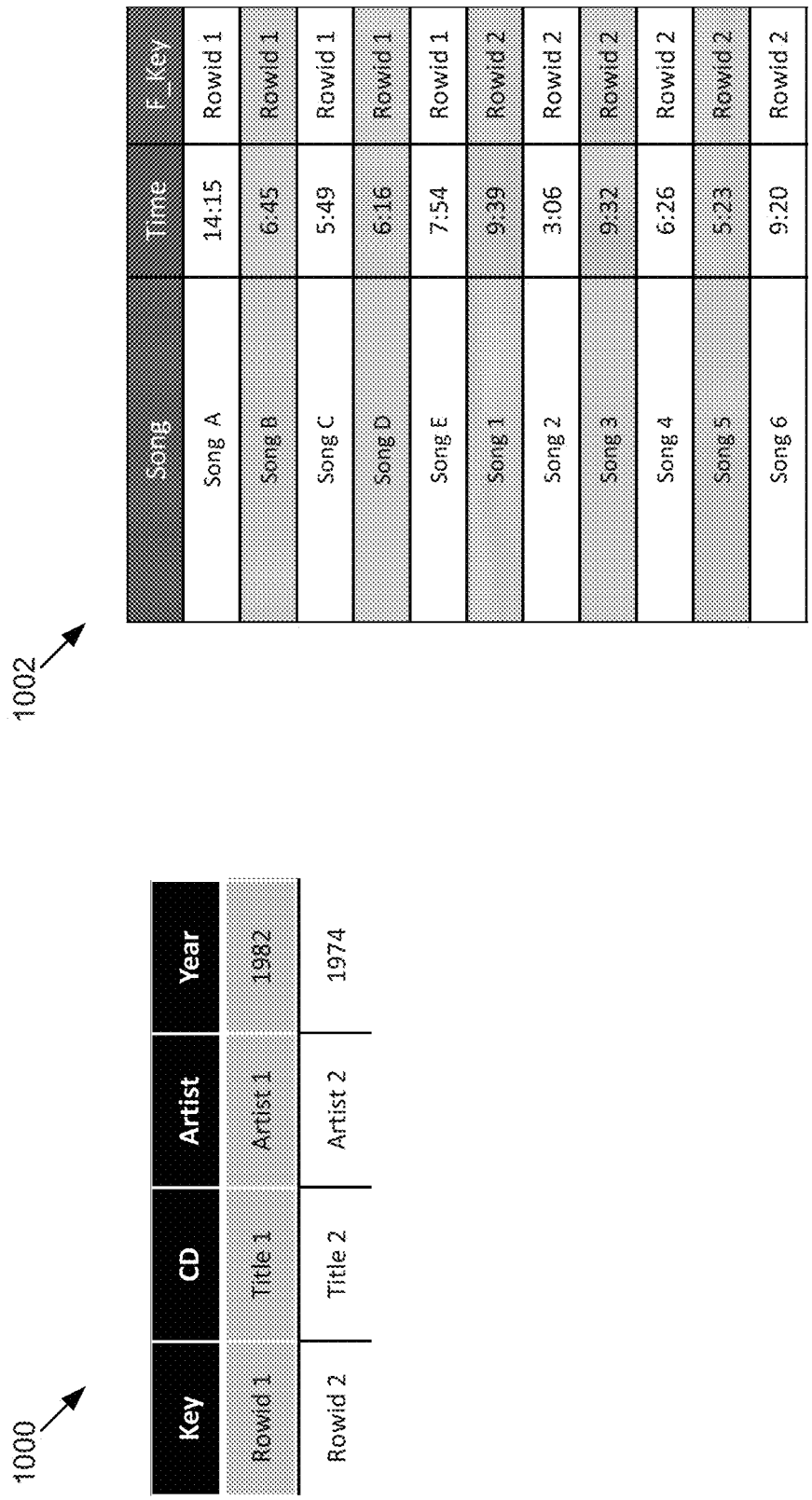
FIG. 10 is an example of normalized, relational database tables according to one embodiment.

FIG. 6 depicts method 600 performed by the system described above in reference to FIGS. 1-4. The method 600 begins at block 500. At block 500, the model generation module 224 generates a normalized, virtual relational model of a non-relational database, e.g., using method 500 described above. At block 604, the query translator module 422 receives a relational query. At block 606, the query translator module 422 retrieves the normalized, virtual relational model. At block 608, the query translator module 422 translates the relational query into a non-relational query based on the normalized, virtual relational model retrieved at block 606. At block 610, the query translator module 422 sends the non-relational query to the non-relational database 120. At block 612, the response translator module 424 receives a response from the non-relational database 120. At block 614, the response translator module 424 translates the non-relational response received at block 612 into a relational response based on the normalized, virtual relational model. At block 616, the response translator module 424 sends the relational response.

In some embodiments, after the relational response is sent at block 616, blocks 604-616 may be repeated for subsequent queries before ending the process (e.g. before disconnecting from the non-relational database). In other words, in some embodiments, the normalized, virtual relational model need not be generated (i.e. block 500 is not necessarily repeated) for each query. For example, depending on the embodiment, the normalized, virtual relational model is generated (e.g. block 500 is performed) responsive to one or more of connecting to the non-relational database, a schema modifying update (e.g. addition/removal of a column in the non-relational database) and the expiration of a period and the generated relational model may be used repeatedly in the translation of multiple queries and responses.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc.

Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
   receiving, using one or more processors, a relational query from a client;
   obtaining, using the one or more processors, a relational model of a column-oriented, non-relational database, wherein the column-oriented, non-relational database includes a first column having a first type and a second column having a second type, and wherein the relational model includes catalog information representing a parent table including the first column having the first type and catalogue information representing a child table including the second column having the second type, wherein the parent table and child table are both represented as relational tables; and
   translating, using the one or more processors, the relational query into a non-relational query using the relational model.

2. The method of claim 1 comprising:
   sending the non-relational query to the non-relational database;
   receiving, using the one or more processors, a non-relational response from the non-relational database;
   translating the non-relational response into a relational response; and
   sending the relational response to the client.

3. The method of claim 1, wherein the first type is static in that all rows of the non-relational database share the first column, and the second type is dynamic in that less than an entirety of rows in the non-relational database share the second column.

4. The method of claim 1, wherein the second column is identified as having the second type based on a sub-type.

5. The method of claim 1, wherein the second type is dynamic and wherein the dynamic type is associated with a plurality of sub-types.

6. The method of claim 1, wherein the second type is one or more of a set, a list, and a map.

7. The method of claim 1, wherein the relational model of the non-relational database is generated based on a division of the column-oriented, non-relational database based on column type, the column-oriented.

8. The method of claim 7, wherein the division of the column-oriented, non-relational database based on column type is a virtual division.

9. The method of claim 7, wherein the relational model of the column-oriented, non-relational database is a normalized relational model.

10. A system comprising:
a processor; and
a memory storing instructions that, when executed by the one or more processors, cause the system to perform steps comprising:
receive a relational query from a client;
obtain a relational model of a column-oriented, non-relational database, wherein the column-oriented, non-relational database includes a first column having a first type and a second column having a second type, and wherein the relational model includes catalog information representing a parent table including the first column having the first type and catalogue information representing a child table including the second column having the second type, wherein the parent table and child table are both represented as relational tables; and
translate the relational query into a non-relational query using the relational model.

11. The system of claim 10, the instructions, when executed, further causing the system to perform steps comprising:
send the non-relational query to the non-relational database;
receive a non-relational response from the non-relational database;
translate the non-relational response into a relational response; and
send the relational response to the client.

12. The system of claim 10, wherein the first type is static in that all rows of the non-relational database share the first column, and the second type is dynamic in that less than an entirety of rows in the non-relational database share the second column.

13. The system of claim 10, wherein the second column is identified as having the second type based on a sub-type.

14. The system of claim 10, wherein the second type is dynamic and wherein the dynamic type is associated with a plurality of sub-types.

15. The system of claim 10, wherein the second type is one or more of a set, a list, and a map.

16. The system of claim 10, wherein the relational model of the non-relational database is generated based on a division of the column-oriented, non-relational database based on column type, the column-oriented.

17. The system of claim 16, wherein the division of the column-oriented, non-relational database based on column type is a virtual division.

18. The system of claim 16, wherein the relational model of the column-oriented, non-relational database is a normalized relational model.

* * * * *